United States Patent [19]

Lovell et al.

[11] 4,351,542
[45] Sep. 28, 1982

[54] FLEXIBLE TOWING HITCH

[76] Inventors: Robert Lovell; Robert Vanos, both of 199 Parramatta Rd., Homebush, New South Wales, Australia, 2140

[21] Appl. No.: 167,363

[22] Filed: Jul. 10, 1980

[51] Int. Cl.³ .............................................. B60D 1/00
[52] U.S. Cl. .................................. 280/489; 267/138; 267/150
[58] Field of Search ............... 280/483, 484, 485, 489, 280/490 R; 267/138, 150

[56] References Cited

U.S. PATENT DOCUMENTS

| | | | |
|---|---|---|---|
| 1,819,393 | 8/1931 | Staley | 280/487 X |
| 2,287,234 | 6/1942 | Ducharme | 280/483 |
| 2,523,733 | 9/1950 | Stephens | 280/489 |
| 3,250,548 | 5/1966 | Boyd | 280/489 |

FOREIGN PATENT DOCUMENTS 527167 8/1921 France ................. 280/485

*Primary Examiner*—John A. Pekar
*Attorney, Agent, or Firm*—Sandler & Greenblum

[57] ABSTRACT

A towing hitch having a main frame for attachment to a vehicle, a tongue force transmitting member pivotally coupled to the main frame, and a resilient member supporting said force transmitting member so as to absorb shock forces applied to the last mentioned member.

3 Claims, 3 Drawing Figures

FLEXIBLE TOWING HITCH

The present invention relates to towing hitches and more particularly, though not exclusively, to flexible towing hitches.

Known towing hitches, of which the most common employ a pivot ball to engage a correspondingly shaped coupling on the vehicle to be towed, a pivotable but rigid towing system. It is a disadvantage of these known hitches and couplings that the combination thereof is relatively rigid and accordingly transmits shocks from the towed vehicle to the prime mover to which the towing hitch is affixed. These shock forces cause undue wear and damage to both vehicles.

It is the object of the present invention to overcome or substantially ameliorate the above disadvantages.

There is disclosed herein a towing hitch comprising a first frame to be fixed to a vehicle, a towing force transmitting member to which a towed vehicle is to be coupled, a pivot attaching said member to said frame enabling said member to pivot movement about a generally horizontal axis through a predetermined angle, and resilient means extending between said member and said frame biasing said member to a predetermined position along said path.

A preferred form of the present invention will now be described by way of example with reference to the accompanying drawings, in which.

Figure 1:
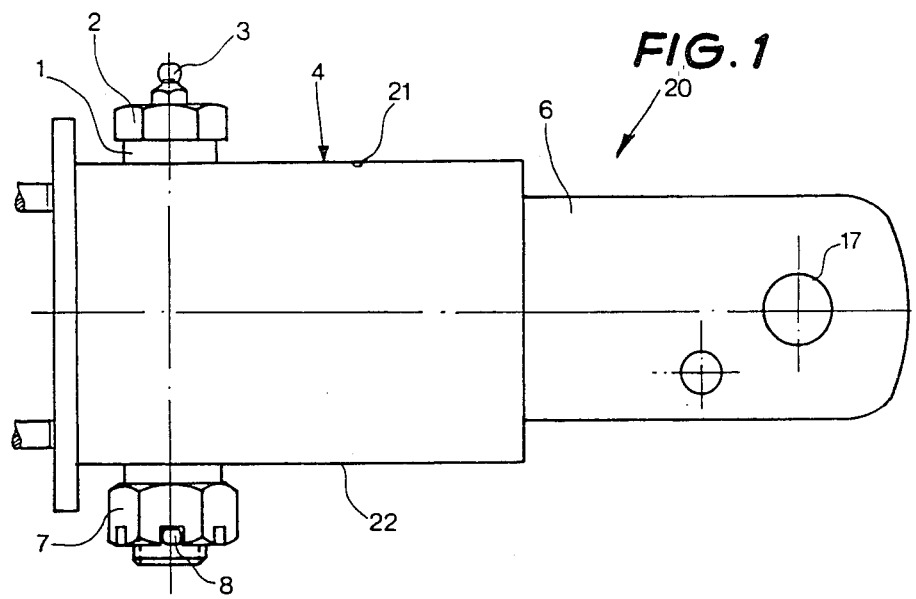
FIG. 1 is a plan view of a towing coupling.
Figure 2:
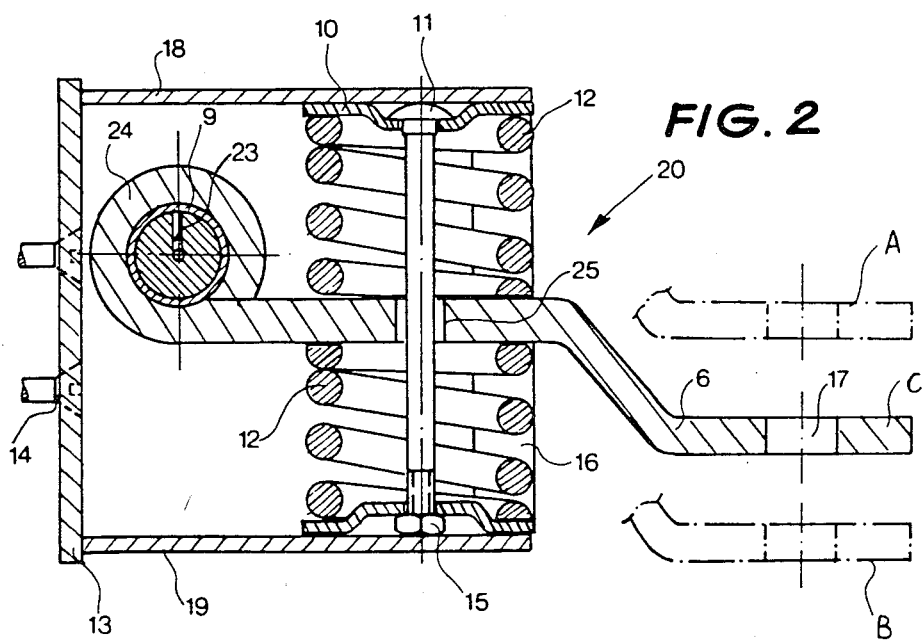
FIG. 2 is a sectioned side elevation of the coupling of FIG. 1.

The towing hitch 20 depicted in FIGS. 1 and 2 is adapted to extend between a prime mover and a vehicle to be towed. It is further adapted to provide for a flexible coupling between the prime mover and the towed vehicle to allow relative vertical movement between the leading portion of the towed vehicle and the trailing portion of the prime mover in order to reduce the transmission of shock forces therebetween. The backing plate 13 is provided with two high tensile screws 14 to provide for the securing of the coupling 20 to the prime mover while there is also provided in the tongue 6, which transmits the towing force to the towed vehicle, a passage 17 to receive the shank of a tow-ball. A correspondingly shaped coupling on the towed vehicle is provided for attachment to the tow-ball. The coupling 20 further comprises a housing 4 which has upper and lower plate members 18 and 19 and side plate members 21 and 22. Extending between the side plate members 21 and 22, to pivotably couple the tongue 6 to the housing 4, is a high tensile bolt 2 and nut 7. The nut 7 is secured to the bolt 2 by split pin 8 to prevent relative rotation about the axis of bolt 2. Steel bushes 1 are located between the head of the bolt 2 and the nut 7 to provide additional bearing area for the bolt 2 and nut 7. The bolt 2 has an internal passage 23 which is closed by a grease nipple 3 to provide for the lubrication of the bearing surfaces of the tongue 6 and bolt 2. The tongue 6 has an end portion 24 of a generally annular cross-section encompassing a portion of the bolt 2, while there is provided around that portion a bush 9 to reduce wear.

Located within the housing 4 are two coil springs 12 which extend between end plates 10 which are held in position by bolt 11 and nut 15. The bolt 11 may be pretensioned so that the coil springs 12 are prestressed. The coil springs 12 are located above and below the tongue 6 and are adapted to bear against the upper and lower plate members 18 and 19 and the tongue 6 to resiliently bias the tongue 6 to the position C. The tongue 6 is provided with a passage 25 to allow the bolt 11 to pass therethrough. There is further provided within the housing 4 wear plates 16 which abut the side surfaces of the tongue 6 to prevent transverse movement of the tongue relative to the housing 4.

In operation the bolt 2 and springs 12 engage the tongue 6 so that it may pivot and move along a predetermined path between upper and lower positions A and B. The movement of the tongue along this predetermined path transfers to the springs 12 part of the shock forces applied to the tongue 6.

Figure 3:
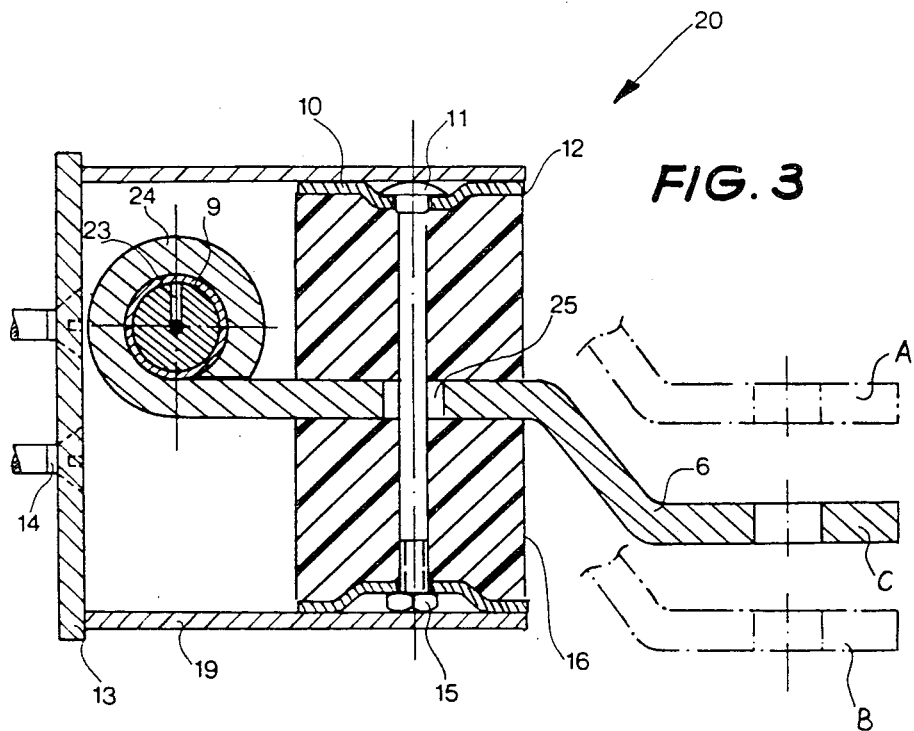
FIG. 3 is a sectioned side elevation of a modification of the coupling of FIG. 1.

In FIG. 3 the coupling 20 has been modified by replacing the spring 12 with a resilient pad 26. The pad 26 has a central slot to allow the tongue 6 to pass through it. Additionally, the pad has a passage to also allow the bolt 11 to pass through it.

What we claim is:

1. A towing hitch comprising a hollow housing having an upper and lower generally horizontal wall, said housing being fixed to a frame adapted to be attached to a vehicle, a towing force transmitting member to which a towed vehicle is to be coupled, a pivot attaching said member to said frame enabling said member to pivot about a generally horizontal axis through a predetermined angle and to extend generally horizontally outwardly of said hollow housing, and a resilient assembly means extending between said member and said frame biasing said member to a predetermined position relative to said housing, said assembly means including an upper and lower resilient member both abutting said towing member with said upper member extending toward said upper wall and said lower member extending toward said lower wall, an upper restraining plate member for said upper resilient member, said upper resilient plate member being generally horizontally disposed and sandwiched between said upper wall and said upper resilient member, a lower restraining plate member for said lower resilient member, said lower restraining plate member being generally horizontally disposed and sandwiched between said lower resilient member and said lower wall, tensioning means extending between said upper and lower plate members for applying a compressive force thereto so as to place said resilient members under compression so that said towing member is biased to said predetermined position within said housing.

2. The towing hitch of claim 1 wherein said resilient members are pads of resilient material through which said towing member passes.

3. The towing hitch of claim 1 wherein said resilient members are springs through which said towing member passes.

* * * * *

UNITED STATES PATENT AND TRADEMARK OFFICE
CERTIFICATE OF CORRECTION

PATENT NO. : 4,351,542

DATED : September 28, 1982

INVENTOR(S) : Robert LOVELL et al.

It is certified that error appears in the above-identified patent and that said Letters Patent is hereby corrected as shown below:

On the first page of the patent, the assignee of the patent should be identified as follows: --

Assignee: Lovell's Springs Pty. Ltd.,
Homebush, New South Wales, Australia --

Signed and Sealed this

Eighth Day of February 1983

[SEAL]

Attest:

Attesting Officer

GERALD J. MOSSINGHOFF

Commissioner of Patents and Trademarks